United States Patent
Choi et al.

(10) Patent No.: US 10,431,841 B2
(45) Date of Patent: Oct. 1, 2019

(54) METHOD FOR MANUFACTURING SOLID OXIDE FUEL CELL

(71) Applicant: LG CHEM, LTD., Seoul (KR)

(72) Inventors: Jeong Mi Choi, Daejeon (KR); Jongjin Lee, Daejeon (KR); Bu Won Son, Daejeon (KR); Kwangwook Choi, Daejeon (KR); Sanghyeok Im, Daejeon (KR); Takkeun Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/518,503

(22) PCT Filed: Nov. 5, 2015

(86) PCT No.: PCT/KR2015/011862
§ 371 (c)(1),
(2) Date: Apr. 12, 2017

(87) PCT Pub. No.: WO2016/080681
PCT Pub. Date: May 26, 2016

(65) Prior Publication Data
US 2017/0237103 A1    Aug. 17, 2017

(30) Foreign Application Priority Data
Nov. 18, 2014  (KR) .......... 10-2014-0160972

(51) Int. Cl.
*H01M 8/00*    (2016.01)
*H01M 8/1246*    (2016.01)
(Continued)

(52) U.S. Cl.
CPC ....... *H01M 8/1246* (2013.01); *H01M 4/8875* (2013.01); *H01M 2008/1293* (2013.01); *Y02E 60/525* (2013.01); *Y02P 70/56* (2015.11)

(58) Field of Classification Search
CPC ....... H01M 8/1246; H01M 2008/1293; H01M 4/8875; Y02P 70/56; Y02E 60/525
See application file for complete search history.

(56) References Cited

U.S. PATENT DOCUMENTS

| 5,480,737 A | * | 1/1996 | Satake | ............ C25B 9/00 |
| | | | | 429/495 |
| 6,267,869 B1 | * | 7/2001 | MacLeod | ......... B23H 3/00 |
| | | | | 204/224 M |

(Continued)

FOREIGN PATENT DOCUMENTS

| EP | 2 413 408 A1 | 2/2012 |
| JP | 9-320616 A | 12/1997 |

(Continued)

OTHER PUBLICATIONS

International Search Report issued in PCT/KR2015/011862 (PCT/ISA/210), dated Mar. 4, 2016.

(Continued)

*Primary Examiner* — Cynthia H Kelly
*Assistant Examiner* — Monique M Wills
(74) *Attorney, Agent, or Firm* — Birch, Stewart, Kolasch & Birch, LLP

(57) ABSTRACT

According to the present disclosure, a pattern comprising protrusions and grooves is formed on all layers in a laminate laminating a composition layer for preparing an electrolyte; and at least one of a composition layer for preparing a fuel electrode and a composition layer for preparing an air electrode on the composition layer for preparing an electrolyte, which leads to advantages of saving time and costs in terms of process by carrying out sintering and pattern forming at once, while improving cell efficiency by increasing a surface area of the electrolyte layer.

10 Claims, 2 Drawing Sheets

(51) Int. Cl.
*H01M 4/88* (2006.01)
*H01M 8/124* (2016.01)

(56) References Cited

U.S. PATENT DOCUMENTS

| | | | | |
|---|---|---|---|---|
| 2008/0003484 | A1* | 1/2008 | Chen | H01M 8/0206 |
| | | | | 429/483 |
| 2009/0173442 | A1 | 7/2009 | Suzuki | |
| 2013/0154147 | A1* | 6/2013 | Mohanram | H01M 8/1246 |
| | | | | 264/49 |
| 2013/0177831 | A1* | 7/2013 | Lin | H01M 8/2465 |
| | | | | 429/468 |
| 2013/0244131 | A1* | 9/2013 | Arcella | H01M 8/0232 |
| | | | | 429/480 |

FOREIGN PATENT DOCUMENTS

| | | |
|---|---|---|
| JP | 2006-236989 A | 9/2006 |
| JP | 2008-4486 A | 1/2008 |
| JP | 2010-287441 A | 12/2010 |
| JP | 2012-69418 A | 4/2012 |
| KR | 10-2009-0040566 A | 4/2009 |
| KR | 10-2011-0057938 A | 6/2011 |
| KR | 10-2012-0066415 A | 6/2012 |
| KR | 10-2013-0057205 A | 5/2013 |

OTHER PUBLICATIONS

Extended European Search Report issued in corresponding EP Application No. 15860449.6 and dated Jun. 8, 2018.

* cited by examiner

[FIG. 1]
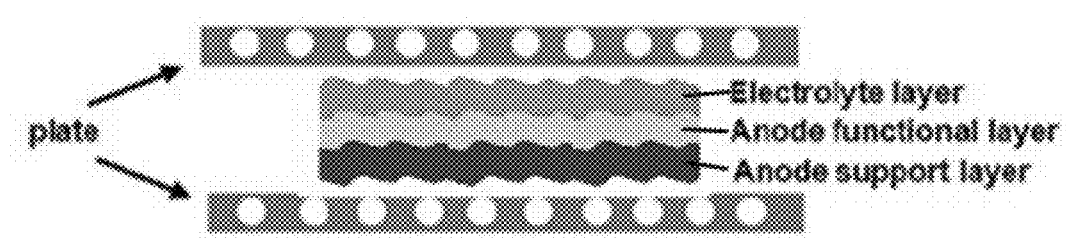
[FIG. 2]
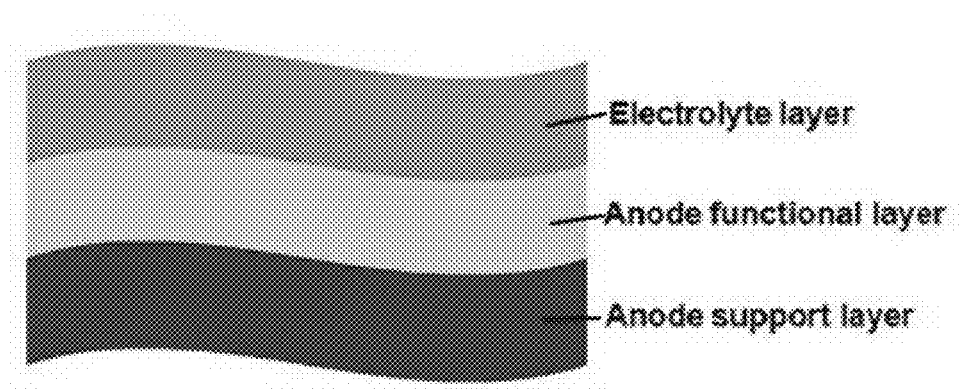
[FIG. 3]
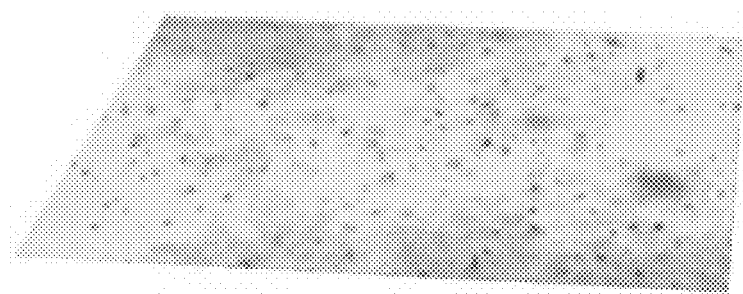

[FIG. 4]
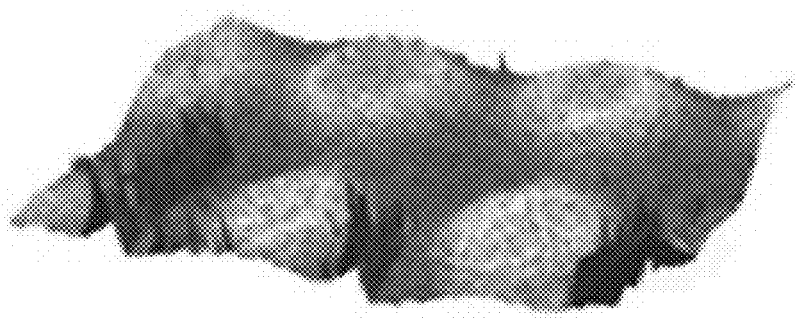

METHOD FOR MANUFACTURING SOLID OXIDE FUEL CELL

TECHNICAL FIELD

This application claims priority to and the benefits of Korean Patent Application No. 10-2014-0160972, filed with the Korean Intellectual Property Office on Nov. 18, 2014, the entire contents of which are incorporated herein by reference.

The present specification relates to a method for manufacturing a solid oxide fuel cell.

BACKGROUND ART

Fuel cells are a device directly converting chemical energy of fuel and air to electricity and heat through an electrochemical reaction. Unlike existing power generating technologies choosing processes of fuel combustion, steam generation, turbine driving and generator driving, fuel cells do not have combustion processes or driving devices, and therefore, is a new power generating technology concept that does not induce environmental problems while providing high efficiency. Such fuel cells are pollution free power generation since air pollution substances such as SOx and NOx are hardly discharged and generation of carbon dioxide is also small as well, and have advantages of low noises and non-vibration.

Fuel cells employ various types such as phosphoric acid fuel cells (PAFC), alkali fuel cells (AFC), polymer electrolyte membrane fuel cells (PEMFC), direct methanol fuel cells (DMFC) and solid oxide fuel cells (SOFC), and among these, solid oxide fuel cells are based on low activated polarization and thereby have low overvoltage, and have small irreversible loss, and accordingly, have high power generation efficiency. In addition, carbon or hydrocarbon-based materials may be used as fuel as well as hydrogen leading to a wide fuel choice, and high-priced precious metals are not required as an electrode catalyst since reaction rates at electrodes are high. Besides, temperatures of heat released incidental to the power generation are very high, which is highly useful. Heat generated in a solid oxide fuel cell may be used not only in fuel reformation, but also as an energy source for industry or cooling in a cogeneration system.

When examining a basic operation principle of a solid oxide fuel cell (SOFC), a solid oxide fuel cell is basically a device generating power through an oxidation reaction of hydrogen, and in an anode that is a fuel electrode, and a cathode that is an air electrode, an electrode reaction as in the following Reaction Formula 1 is progressed.

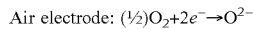

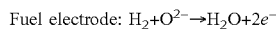

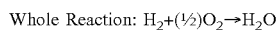   [Reaction Formula 1]

In other words, electrons reach an air electrode through an external circuit, and at the same time, oxygen ions generated in the air electrode are transferred to a fuel electrode through an electrolyte, and in the fuel electrode, hydrogen and the oxygen ions bond to produce electrons and water.

A solid oxide fuel cell is formed with dense electrolyte layers, and a porous air electrode layer and a fuel electrode layer as electrodes placed between the electrolyte layers, and an electrode reaction occurs at boundaries of the electrolyte layers and the electrode layers. In order to increase solid oxide fuel cell efficiency, reaction sites at the boundaries need to be increased, and accordingly, increasing an area of a triple phase boundary (TPB) where gas, an electrolyte and an electrode meet has been required, and as one of the efforts to increase such a reaction area, studies on a method for improving cell performance by increasing a surface area of an electrolyte have been discussed.

DISCLOSURE

Technical Problem

One embodiment of the present specification is directed to providing a method for manufacturing a solid oxide fuel cell.

Technical Solution

One embodiment of the present disclosure provides a method for manufacturing a solid oxide fuel cell comprising: preparing a laminate laminating a composition layer for preparing an electrolyte, and at least one of a composition layer for preparing a fuel electrode and a composition layer for preparing an air electrode on the composition layer for preparing the electrolyte; and forming a pattern comprising protrusions and grooves on all the composition layers in the laminate using a porous plate while simultaneously sintering each of the composition layers of the laminate.

Advantageous Effects

An electrolyte layer prepared according to a preparation method of one embodiment of the present disclosure has a wide surface layer, and has an advantage of improving cell efficiency.

The manufacturing method of one embodiment of the present disclosure simultaneously carries out sintering and pattern formation, and has an advantage of saving time and costs in terms of process.

DESCRIPTION OF DRAWINGS

FIG. 1 is a diagram schematically illustrating a step of forming a pattern comprising protrusions and grooves on a laminate comprising a composition layer for preparing an electrolyte, a composition layer for preparing a fuel electrode functional layer and a composition layer for preparing a fuel electrode support layer using a porous plate.

FIG. 2 is a diagram schematically illustrating a pattern comprising protrusions and grooves being formed on a laminate comprising a composition layer for preparing an electrolyte, a composition layer for preparing a fuel electrode functional layer and a composition layer for preparing a fuel electrode support layer.

FIG. 3 is a diagram showing an electrolyte surface of an existing solid oxide fuel cell.

FIG. 4 is a diagram showing an electrolyte surface on which a pattern comprising protrusions and grooves according to the present disclosure is formed.

MODE FOR DISCLOSURE

Advantages and features of the present application, and methods to achieve these advantages and features will become clear when referencing the embodiments described below in detail with the attached drawings. However, the present application is not limited to the embodiments described below, and will be realized in various different forms, and the present embodiments make the delivery of the present application complete, and are provided in order to completely make known the range of the disclosure to those skilled in the art relating to the present application, and the present application is only defined by the scope of the claims.

Unless otherwise specified, all the terms comprising technical and scientific terms used in the present specification may be used according to the meanings commonly understandable to those skilled in the art relating to the present application. In addition, the terms defined in generally used dictionaries are not interpreted either ideally or immoderately unless clearly specially defined otherwise.

One embodiment of the present specification provides a method for manufacturing a solid oxide fuel cell comprising: preparing a laminate laminating a composition layer for preparing an electrolyte, and at least one of a composition layer for preparing a fuel electrode and a composition layer for preparing an air electrode on the composition layer for preparing the electrolyte; and forming a pattern comprising protrusions and grooves on all the composition layers in the laminate using a porous plate while simultaneously sintering each of the composition layers of the laminate.

As described above, studies on enhancing a reaction area by increasing a surface area of an electrolyte layer have been conducted in the art for enhancing cell performance, and as one of such studies, a method of forming a pattern on the surface of an electrolyte layer has been studied.

As for a polymer electrolyte membrane, the surface area readily increases by forming a pattern on the polymer electrolyte membrane surface before and after preparing the polymer electrolyte membrane due to plasticity unique for polymers.

However, an electrolyte layer of a solid oxide fuel cell is prepared by sintering inorganic oxide particles at a high temperature of 1000° C. or more, and the already sintered electrolyte layer becomes one hard pellet making the pattern formation on the surface difficult.

In the related art, methods such as etching an electrolyte surface after completing sintering, or patterning an electrolyte surface prior to a sintering process have been reported, however, such methods have a disadvantage of being ineffective in terms of time and costs since a sintering process is additionally required in addition to a process forming a pattern on the electrolyte surface.

In view of the above, the inventors of the present disclosure have completed a method for manufacturing a solid oxide fuel cell saving time and costs and enhancing productivity by carrying out a pattern forming process and a sintering process at once while securing cell performance improvement through increasing a reaction area by forming a pattern comprising protrusions and grooves on an electrolyte surface.

According to the present disclosure, an electrolyte layer having a pattern comprising protrusions and grooves formed on the surface may be prepared, and by forming the pattern, the surface area of the electrolyte layer increases, which may lead to cell performance improvement through an increase in the reaction area.

According to one embodiment of the present specification, the laminate may comprise a form of consecutively laminating a composition layer for preparing an electrolyte; and a composition layer for preparing a fuel electrode provided on the composition layer for preparing an electrolyte.

In addition, according to one embodiment of the present specification, the laminate may also comprise a form of consecutively laminating a composition layer for preparing an electrolyte; and a composition layer for preparing an air electrode provided on the composition layer for preparing an electrolyte.

Furthermore, according to one embodiment of the present specification, the laminate may comprise a form of consecutively laminating a composition layer for preparing an electrolyte; a composition layer for preparing a fuel electrode provided on one surface of the composition layer for preparing an electrolyte; and a composition layer for preparing an air electrode provided on the other side of the composition layer for preparing an electrolyte.

Manufacture of a solid oxide fuel cell generally goes through processes of making and laminating layers of three types of an air electrode, a fuel electrode and an electrolyte, and since each layer needs to go through a sintering process in each step to laminate a next membrane, simultaneous baking is carried out using a laminate laminating two or more different layers for saving process time and costs.

According to one embodiment of the present specification, the method for manufacturing a solid oxide fuel cell may be used when simultaneously baking a laminate comprising a composition layer for preparing an electrolyte and a composition layer for preparing a fuel electrode provided on the composition layer for preparing an electrolyte, and may also be used when simultaneously baking a laminate comprising a composition layer for preparing an electrolyte and a composition layer for preparing an air electrode provided on the composition layer for preparing an electrolyte.

According to one embodiment of the present specification, the composition layer for preparing a fuel electrode may comprise a composition layer for preparing a fuel electrode support layer and a composition layer for preparing a fuel electrode functional layer, and the composition layer for preparing a fuel electrode functional layer may be provided between the composition layer for preparing a fuel electrode support layer and the composition layer for preparing an electrolyte.

In addition, according to one embodiment of the present specification, the composition layer for preparing an air electrode may comprise a composition layer for preparing an air electrode support layer and a composition layer for preparing an air electrode functional layer, and the composition layer for preparing an air electrode functional layer may be provided between the composition layer for preparing an air electrode support layer and the composition layer for preparing an electrolyte.

Accordingly, the laminate according to one embodiment of the present specification may comprise a form of consecutively laminating a composition layer for preparing an electrolyte; a composition layer for preparing a fuel electrode functional layer provided on the composition layer for preparing an electrolyte; and a composition layer for preparing a fuel electrode support layer provided on the composition layer for preparing a fuel electrode functional layer.

For example, FIG. 1 illustrates a method of placing a laminate consecutively laminating a composition layer for preparing an electrolyte, a composition layer for preparing a fuel electrode functional layer and a composition layer for preparing a fuel electrode support layer between porous plates, and sintering the laminate to form a pattern comprising protrusions and grooves on the laminate.

In addition, the laminate according to one embodiment of the present specification may also comprise a form of consecutively laminating a composition layer for preparing an electrolyte, a composition layer for preparing an air electrode functional layer provided on the composition layer for preparing an electrolyte; and a composition layer for preparing an air electrode support layer formed on the composition layer for preparing an air electrode functional layer.

According to one embodiment of the present specification, the pattern comprising protrusions and grooves may be formed by placing the laminate between two porous plates and sintering the laminate. Accordingly, sintering may be carried out while forming a pattern on an electrolyte layer through the above-mentioned method.

According to one embodiment of the present specification, the composition layer for preparing an electrolyte, the composition layer for preparing a fuel electrode and the composition layer for preparing an air electrode become an electrolyte layer, a fuel electrode layer and an air electrode layer, respectively, after the sintering.

In addition, according to one embodiment of the present specification, the composition layer for preparing a fuel electrode functional layer and the composition layer for preparing a fuel electrode support layer become a fuel electrode functional layer and a fuel electrode support layer, respectively, after the sintering. In addition, the composition layer for preparing an air electrode functional layer and the composition layer for preparing an air electrode support layer become an air electrode functional layer and an air electrode support layer, respectively, after the sintering.

According to one embodiment of the present specification, a pattern comprising protrusions and grooves may be formed on the upper and the lower surfaces of the laminate or a pattern comprising protrusions and grooves may be formed on all the layers in the laminate through placing and sintering the laminate between two porous plates.

In other words, according to one embodiment of the present specification, each individual layer comprised in the laminate may all form a pattern comprising protrusions and grooves in the sintering.

For example, FIG. 2 illustrates a pattern comprising protrusions and grooves being formed on all layers of an electrolyte layer, a fuel electrode functional layer and a fuel electrode support layer comprised in the laminate.

According to one embodiment of the present specification, when the laminate comprises a composition layer for preparing an electrolyte and a composition layer for preparing a fuel electrode provided on the composition layer for preparing an electrolyte, a pattern comprising protrusions and grooves may be formed on each electrolyte layer and fuel electrode layer in the laminate after the sintering.

According to one embodiment of the present specification, when the laminate comprises a composition layer for preparing an electrolyte and a composition layer for preparing an air electrode provided on the composition layer for preparing an electrolyte, a pattern comprising protrusions and grooves may be formed on each electrolyte layer and air electrode layer in the laminate after the sintering.

The pattern shape of each layer of the laminate formed in the sintering and the pattern forming may be a wave pattern shape on a section in a thickness direction of the laminate. Specifically, the pattern shape of the electrolyte layer of the laminate formed in the sintering and the pattern forming is a wave pattern shape on a section in a thickness direction of the laminate, and the pattern shape of at least one of the air electrode and the fuel electrode of the laminate formed in the sintering and the pattern forming may be a wave pattern shape.

As illustrated in FIG. 2, the pattern shape of all the layers of the laminate formed in the sintering and the pattern forming may be a wave pattern shape.

According to one embodiment of the present specification, the method for manufacturing a solid oxide fuel cell may be carried out in a temperature range of 800° C. to 1600° C., and more preferably, in a range of 900° C. to 1500° C.

According to one embodiment of the present specification, the method for manufacturing a solid oxide fuel cell being carried out in the above-mentioned temperature range enables pattern forming and sintering.

According to one embodiment of the present specification, carrying out the method for manufacturing a solid oxide fuel cell in the above-mentioned temperature range enables sintering while simultaneously forming a pattern comprising protrusions and grooves in the laminate, and is also effective in more readily forming the pattern compared to carrying out the method in temperature ranges other than the above-mentioned temperature range.

According to one embodiment of the present specification, the shape of the porous plate may be adjusted to adjust the shape of the pattern formed in the laminate.

In other words, the porous plate may comprise an engraved portion or an opening portion, and sections of the engraved portion and the opening portion may comprise various shapes.

According to one embodiment of the present specification, a horizontal section of the engraved portion of the porous plate may comprise various shapes such as polygon, circle or oval. In addition, a vertical section of the opening portion of the porous plate may also comprise various shapes such as polygon, circle or oval.

According to one embodiment of the present specification, the surface shapes of the layers placed on the upper and the lower surfaces of the laminate are modified when placing the laminate between the two porous plates and sintering the laminate, and depending on the shape of the engraved portion or the opening portion of the porous plate, a protrusion and/or a groove may be formed on the layers adjoining the porous plate.

According to one embodiment of the present specification, a pattern comprising protrusions and grooves may be formed on the electrolyte layer. Specifically, the pattern shape of the electrolyte layer of the laminate formed in the sintering and the pattern forming may be a wave pattern shape on a section in a thickness direction of the laminate.

According to one embodiment of the present specification, thicknesses of the electrolyte layer on the parts provided with protrusions and the parts provided with grooves are in a range of 10 μm to 50 μm, and the thickness of the electrolyte layer means the shortest length between the upper surface and the lower surface of the electrolyte layer.

According to one embodiment of the present specification, the electrolyte layer preferably has a constant thickness, and the thicknesses of the parts provided with protrusions and the thicknesses of the parts provided with grooves are preferably constant. In other words, when the thicknesses of the electrolyte layer have a small variation while forming a pattern provided with protrusions and grooves on the electrolyte layer, resistance loss may be reduced since a variation in the resistance becomes small while increasing the reaction area of an electrode.

According to one embodiment of the present specification, the thickness variation of the electrolyte layer may be expressed as a Ra value, and the electrolyte layer has a Ra value in a range of 1 μm to 5 μm. When the Ra value is within the above-mentioned numerical range, the electrolyte layer has a small thickness variation, which decreases a variation in the resistance while increasing the reaction area when using a solid oxide fuel cell, and as a result, an effect of reducing resistance loss is obtained.

According to one embodiment of the present specification, a pattern comprising protrusions and grooves may be formed on the fuel electrode layer. Specifically, the pattern shape of the fuel electrode layer of the laminate formed in the sintering and the pattern forming may be a wave pattern shape on a section in a thickness direction of the laminate.

According to one embodiment of the present specification, thicknesses of the fuel electrode layer on the parts provided with protrusions and the parts provided with grooves are in a range of 200 μm to 500 μm, and the thickness of the fuel electrode layer means the shortest length between the upper surface and the lower surface of the fuel electrode layer.

According to one embodiment of the present specification, a pattern comprising protrusions and grooves may be formed on the air electrode layer. Specifically, the pattern shape of the air electrode layer of the laminate formed in the sintering and the pattern forming may be a wave pattern shape on a section in a thickness direction of the laminate.

According to one embodiment of the present specification, thicknesses of the air electrode layer on the parts provided with protrusions and the parts provided with grooves are in a range of 10 μm to 100 μm, and the thickness of the air electrode layer means the shortest length between the upper surface and the lower surface of the air electrode layer.

According to one embodiment of the present specification, when the laminate comprises a composition layer for preparing a fuel electrode in addition to a composition layer for preparing an electrolyte, forming an air electrode layer on an electrolyte layer may be further comprised after forming the pattern comprising protrusions and grooves when sintering.

According to one embodiment of the present specification, when the laminate comprises a composition layer for preparing an air electrode in addition to a composition layer for preparing an electrolyte, forming a fuel electrode layer on an electrolyte layer may be further comprised after forming the pattern comprising protrusions and grooves on the laminate when sintering.

According to one embodiment of the present specification, materials of the electrolyte are not particularly limited as long as they are known in the art.

According to one embodiment of the present specification, the electrolyte layer may comprise an electrolyte powder, a solvent or a binder resin.

According to one embodiment of the present specification, the electrolyte layer may be prepared by, after preparing slurry comprising an electrolyte powder, a solvent or a binder resin, forming a sheet using a method of a tape casting process and the like on the slurry.

According to one embodiment of the present specification, the electrolyte powder may use those known in the art, and may comprise YSZ (yttria stabilized zirconia), ScSZ, LSGM (lanthanum strontium gallate magnesite), GDC (gadolinia doped ceria) and the like, and may additionally comprise electrolyte materials that have been used as an electrolyte powder in the art.

According to one embodiment of the present specification, YSZ is a representative ionic conductor, and has excellent oxidation resistance and strength under reduced atmosphere while having high ionic conductivity at high temperatures, and LSGM, GDC and the like have higher ionic conductivity compared to YSZ, and therefore, are effective in lowering an operation temperature of a solid oxide fuel cell.

According to one embodiment of the present specification, solvents known in the art may be used as the solvent used for the electrolyte layer, and any solvent may be used as long as it prevents the compositions from being dried during a manufacturing process and is capable of controlling flowability. Non-limiting examples of the solvent may comprise triethylene glycol ethyl ether, ethylene glycol hexyl ether, diethylene glycol ethyl ether, tripropylene glycol methyl ether, 2,2,4-trimethyl-1,3-pentanediol monoisobutyrate (texanol), ethylene glycol, toluene, ethanol, xylene and the like, and these may be used either alone or as a mixture of two or more types.

According to one embodiment of the present specification, binders known in the art may be used as the binder used for the electrolyte layer, and non-limiting examples thereof may comprise polyvinylbutyral, polyvinyl alcohol (PVA), polyvinyl pyrrolidone, polyethylene glycol, xylene, polyethylene, polypropylene, polystyrene, polyvinylidene chloride, polycarbonate, polyimide, polymethyl methacrylate (PMMA), ethyl cellulose, phenol, polyvinyl chloride, polyvinylidene chloride and the like, and these may be used either alone or as a mixture of two or more types.

According to one embodiment of the present specification, the electrolyte layer may additionally comprise other additives in addition to the electrolyte powder, the solvent or the binder resin, and may comprise a plasticizer, a dispersant and the like.

According to one embodiment of the present specification, the dispersant is not particularly limited as long as it is known in the art, and non-limiting examples thereof may comprise BYK-110, BYK-111 and the like.

According to one embodiment of the present specification, the fuel electrode may comprise a fuel electrode support layer (anode support layer) and a fuel electrode functional layer (anode functional layer). The fuel electrode functional layer may be a porous membrane, and this may be provided between the fuel electrode support layer and the electrolyte layer. More specifically, the fuel electrode functional layer may be a region adjoining the electrolyte layer to produce an electrochemical reaction.

According to one embodiment of the present specification, the fuel electrode support layer performs a role of a support layer of a fuel electrode, and for this, may be formed to be relatively thicker than the fuel electrode functional layer. In addition, the fuel electrode support layer enables fuel to smoothly reach the fuel electrode functional layer, and may enhance electric conductivity.

According to one embodiment of the present specification, materials of the fuel electrode are not particularly limited as long as they are known in the art.

According to one embodiment of the present specification, the fuel electrode layer may comprise YSZ (yttria stabilized zirconia), LSGM (lanthanum strontium gallate magnesite), GDC (gadolinia doped ceria) or the like, and may comprise those known in the art in addition thereto.

According to one embodiment of the present specification, materials of the fuel electrode support layer are not particularly limited as long as they are known in the art.

According to one embodiment of the present specification, the fuel electrode support layer may comprise a porous metal oxide powder, a solvent or a binder resin, and non-limiting examples of the metal oxide may comprise Zr, Ce, Ti, Mg, Al, Si, Mn, Fe, Co, Ni, Cu, Zn, Mo, Y, Nb, Sn, La, Ta, V, Nd oxides and the like, and preferably, Ni oxides such as NiO are used.

According to one embodiment of the present specification, Ni is a representative oxidation reaction catalyst of hydrogen and has an advantage of being inexpensive, but has a disadvantage of low mechanical strength, and therefore, may be present in a cermet form by forming a complex with the same ceramic as the electrolyte material. In this case, materials such as YSZ, LSGM or GDC may be used as the ceramic.

According to one embodiment of the present specification, solvents known in the art may be used as the solvent used for the fuel electrode support layer, and any solvent may be used as long as it prevents the compositions from being dried during a manufacturing process and is capable of controlling flowability. Non-limiting examples of the solvent may comprise triethylene glycol ethyl ether, ethylene glycol hexyl ether, diethylene glycol ethyl ether, tripropylene glycol methyl ether, 2,2,4-trimethyl-1,3-pentanediol monoisobutyrate (texanol), ethylene glycol, toluene, ethanol and the like, and these may be used either alone or as a mixture of two or more types.

According to one embodiment of the present specification, binders known in the art may be used as the binder used for the fuel electrode support layer, and non-limiting examples thereof may comprise polyvinylbutyral, polyvinyl alcohol (PVA), polyvinyl pyrrolidone, polyethylene glycol, xylene, polyethylene, polypropylene, polystyrene, polyvinylidene chloride, polycarbonate, polyimide, polymethyl methacrylate (PMMA), ethyl cellulose, phenol, polyvinyl chloride, polyvinylidene chloride and the like, and these may be used either alone or as a mixture of two or more types.

According to one embodiment of the present specification, the air electrode may comprise an air electrode support layer (cathode support layer) and an air electrode functional layer (cathode functional layer).

According to one embodiment of the present specification, the air electrode functional layer may be a porous membrane, and this may be provided between the air electrode support layer and the electrolyte layer. More specifically, the air electrode functional layer may be a region adjoining the electrolyte layer to produce an electrochemical reaction.

According to one embodiment of the present specification, the air electrode support layer performs a role of a support layer of an air electrode, and for this, may be formed to be relatively thicker than the air electrode functional layer. In addition, the air electrode support layer enables air to smoothly reach the air electrode functional layer, and may enhance electric conductivity.

Materials of the air electrode are not particularly limited as long as they are known in the art.

According to one embodiment of the present specification, as for the air electrode layer, an air electrode coating layer may be formed by coating slurry comprising a metal oxide such as strontium doped lanthanum manganite (LSM) and YSZ on one surface of the electrolyte layer, and after that, the air electrode layer may be formed by sintering the air electrode coating layer provided on the electrolyte layer.

Hereinafter, the present specification will be described in more detail with reference to examples. However, the following examples are for illustrative purposes only, and the scope of the present specification is not limited thereto.

Example 1

1. Slurry Preparation

Approximately 30% by weight to 50% by weight of GDC was mixed with a dispersant, a plasticizer and an acryl-based binder to prepare solid electrolyte slurry. Approximately 20% by weight to 30% by weight of GDC and approximately 20% by weight to 30% by weight of NiO were mixed with a dispersant, a plasticizer and an acryl-based binder to prepare fuel electrode functional layer slurry. In addition, fuel electrode support layer slurry was prepared by mixing approximately 10% by weight to 30% by weight of GDC, approximately 20% by weight to 40% by weight of NiO, approximately 1% by weight to 10% by weight of a pore forming agent, a dispersant, a plasticizer and an acryl-based binder.

2. Tape Preparation and Lamination

The prepared slurry was applied on a doctor blade to prepare solid electrolyte layer, fuel electrode functional layer and fuel electrode support layer tapes. Each tape was laminated to manufacture a laminate for a solid oxide fuel cell (SOFC).

3. Pattern Forming and Sintering

Alumina porous plates having a diameter of 1 mm and having a through tube perforating in a thickness direction were placed at the top and the bottom of the laminate for a solid oxide fuel cell, and the laminate was sintered in a range of 1000° C. to 1600° C. to form a pattern comprising protrusions and grooves on the top and the bottom surfaces of the laminate.

FIG. 4 shows a pattern comprising protrusions and grooves being formed on an electrolyte layer using the method according to Example 1, and Ra of the sintered solid electrolyte surface was in a range of 1.5 μm to 5 μm.

Comparative Example 1

A solid oxide fuel cell was manufactured in the same manner as in Example 1 except that flat plates were placed on the top and the bottom surfaces of the laminate instead of using the porous plates to be sintered in a range of 1000° C. to 1600° C.

FIG. 3 shows a surface shape of the solid oxide fuel cell manufactured according to Comparative Example 1, and Ra of the sintered solid electrolyte surface was in a range of 0 μm to 0.5 μm.

The invention claimed is:

1. A method for manufacturing a solid oxide fuel cell comprising:
   preparing a laminate of the solid oxide fuel cell by laminating a composition layer for preparing an electrolyte, and at least one of a composition layer for preparing a fuel electrode and a composition layer for preparing an air electrode on the composition layer for preparing an electrolyte;
   providing the laminate between two porous plates, wherein each porous plate has either an engraved portion or an opening portion;
   forming a pattern comprising protrusions and grooves on all the composition layers in the laminate using the porous plates while simultaneously sintering each of the composition layers of the laminate; and
   removing the porous plates after forming the pattern,
   wherein a shape of the pattern formed in the sintering and the pattern forming between the porous plates is a wave pattern shape on a section in a thickness direction of the laminate.

2. The method for manufacturing the solid oxide fuel cell of claim 1, wherein the laminate comprises a form of laminating the composition layer for preparing the electrolyte; the composition layer for preparing the fuel electrode provided on one surface of the composition layer for preparing the electrolyte; and the composition layer for preparing the air electrode provided on a surface opposite to a surface of the composition layer for preparing the electrolyte provided with the composition layer for preparing the fuel electrode.

3. The method for manufacturing the solid oxide fuel cell of claim 1, wherein the composition layer for preparing a fuel electrode comprises a composition layer for preparing a fuel electrode support layer and a composition layer for preparing a fuel electrode functional layer, and the composition layer for preparing the fuel electrode functional layer is provided between the composition layer for preparing the fuel electrode support layer and the composition layer for preparing the electrolyte.

4. The method for manufacturing the solid oxide fuel cell of claim 1, wherein the composition layer for preparing the air electrode comprises a composition layer for preparing an air electrode support layer and a composition layer for preparing an air electrode functional layer, and the composition layer for preparing the air electrode functional layer is provided between the composition layer for preparing the air electrode support layer and the composition layer for preparing the electrolyte.

5. The method for manufacturing the solid oxide fuel cell of claim 1, wherein, in the sintering and the pattern forming, the sintering temperature is 800° C. or more and 1600° C. or less.

6. The method for manufacturing the solid oxide fuel cell of claim 1, wherein, in a direction vertical to a thickness direction of the laminate, a section of the engraved portion is polygon, circle or oval, and a vertical section of the opening portion is polygon, circle or oval.

7. The method for manufacturing the solid oxide fuel cell of claim 1, wherein thicknesses of the electrolyte layer on the parts provided with protrusions and the parts provided with grooves are 10 μm or more and 50 μm or less.

8. The method for manufacturing the solid oxide fuel cell of claim 1, wherein the electrolyte layer has a Ra value of 1 μm or more and 5 μm or less.

9. The method for manufacturing the solid oxide fuel cell of claim 1, wherein the laminate comprises a form of laminating the composition layer for preparing the electrolyte; and the composition layer for preparing the fuel electrode provided on the composition layer for preparing the electrolyte, and after the sintering and the pattern forming, the method further comprises forming an air electrode layer on a surface opposite to a surface of the sintered electrolyte layer provided with the fuel electrode.

10. The method for manufacturing the solid oxide fuel cell of claim 1, wherein the laminate comprises a form of laminating the composition layer for preparing the electrolyte; and the composition layer for preparing the air electrode provided on the composition layer for preparing the electrolyte, and after the sintering and the pattern forming, the method further comprises forming a fuel electrode layer on a surface opposite to a surface of the sintered electrolyte layer provided with the air electrode.

* * * * *